(12) United States Patent
Whipple et al.

(10) Patent No.: US 9,281,678 B2
(45) Date of Patent: Mar. 8, 2016

(54) ELECTRICAL SURGE PROTECTION DEVICE

(71) Applicant: EATON CORPORATION, Cleveland, OH (US)

(72) Inventors: Michael Jerome Whipple, Rochester, PA (US); David Wayne Stiffler, Burgettstown, PA (US)

(73) Assignee: EATON CORPORATION, Cleveland, OH (US)

( * ) Notice: Subject to any disclaimer, the term of this patent is extended or adjusted under 35 U.S.C. 154(b) by 83 days.

(21) Appl. No.: 14/197,610

(22) Filed: Mar. 5, 2014

(65) Prior Publication Data
US 2015/0255980 A1    Sep. 10, 2015

(51) Int. Cl.
*H05K 9/00* (2006.01)
*H02H 9/00* (2006.01)
*H02H 9/04* (2006.01)

(52) U.S. Cl.
CPC ............ *H02H 9/005* (2013.01); *H02H 9/044* (2013.01)

(58) Field of Classification Search
USPC ........ 361/1.54, 117–120, 131, 728–730, 799, 361/816, 818; 174/35 R, 51, 50; 337/142, 337/186, 187, 190; 439/801, 813, 814, 651, 439/709–717
See application file for complete search history.

(56) References Cited

U.S. PATENT DOCUMENTS

| | | | | |
|---|---|---|---|---|
| 4,872,081 | A * | 10/1989 | Murphy et al. | 361/117 |
| 5,797,756 | A * | 8/1998 | Nad | 439/94 |
| 6,019,627 | A * | 2/2000 | Embo et al. | 439/412 |
| 6,428,350 | B1 * | 8/2002 | Robinson et al. | 439/517 |
| 6,663,422 | B1 * | 12/2003 | Robinson et al. | 439/517 |
| 7,719,804 | B1 * | 5/2010 | Morgan et al. | 361/42 |
| 8,382,524 | B2 * | 2/2013 | Khilchenko et al. | 439/620.09 |

* cited by examiner

*Primary Examiner* — Hung S Bui
(74) *Attorney, Agent, or Firm* — Eckert Seamans Cherin & Mellott, LLC; Brij K. Agarwal; Grant E. Coffield

(57) ABSTRACT

An electrical surge protection device is structured to be installed on an electrical enclosure and to be electrically connected between one or more line conductors and one or more ground or neutral conductors. The electrical surge protection device includes a support that is structured to be installed on the electrical enclosure and a number of varistors or other electrical components that will, in the event of a voltage surge on a line conductor, shunt electrical energy from the voltage surge to the ground or neutral conductor with which it is connected. The electrical surge protection device advantageously further includes a shield apparatus that is structured to restrain an increased ambient pressure and that is electrically conductive and is electrically connected with the ground or neutral conductor.

12 Claims, 5 Drawing Sheets

ELECTRICAL SURGE PROTECTION DEVICE

BACKGROUND

1. Field

The disclosed and claimed concept relates generally to electrical distribution equipment and, more particularly, to an electric surge protection device for use in an electrical enclosure.

2. Related Art

Electrical distribution equipment is generally well understood in the relevant art. Electrical distribution equipment includes, by way of example, load centers, circuit breaker enclosures, circuit breakers, wires, and other such equipment. While such equipment has been generally effective for its intended purposes, it has not been without limitation.

It is understood that an electrical supply can suffer from voltage fluctuations and occasional voltage surges or spikes. Most electrical equipment that is connected with a source of electrical power is designed to accommodate voltage fluctuations but is not typically configured to withstand a voltage surge beyond a nominal voltage increase.

It thus has been known to provide surge protection devices that include structures such as varistors and the like that are configured to shunt current to a ground or a neutral conductor when excessive voltage is encountered. A varistor has a resistance that changes as a function of the voltage that is experienced. At or below a predetermined voltage, the resistance of the varistor is very high. However, the resistance of the varistor drops rapidly in response to voltage above a predetermined threshold. As such, varistors are typically connected between a line conductor and a ground or a neutral conductor and conduct very little current to the ground or neutral conductor when normal voltages, i.e., voltages within a predetermined voltage range, are experienced. However, when the voltage surges outside the predetermined range, the varistors experience reduced resistance and thus shunt electrical power from the voltage surge to the ground or neutral conductor, thereby protecting from destruction a piece of electrical equipment that is connected with the same circuit. One common type of varistor is the metal-oxide varistor (MOV), although other types of varistors are usable in surge protection applications.

It is also known, however, that a varistor is typically designed to shunt significant power for only a short duration of time and typically does not have the capacity to shunt excess power in a sustained fashion over an extended period of time. Depending upon the voltage surge, one or more varistors can experience catastrophic failure, which can result in the generation of high pressures or temperatures or both being generated by the failing varistors. It thus would be desirable to provide an improved electrical surge protection device that provides improved performance.

SUMMARY

An improved electrical surge protection device is structured to be installed on an electrical enclosure and to be electrically connected between one or more line conductors and one or more ground or neutral conductors. The electrical surge protection device includes a support that is structured to be installed on the electrical enclosure and a number of varistors or other electrical components that will, in the event of a voltage surge on a line conductor, shunt electrical energy from the voltage surge to the ground or neutral conductor with which it is connected. The electrical surge protection device advantageously further includes a shield apparatus that is structured to restrain an increased ambient pressure and that is electrically conductive and is electrically connected with the ground or neutral conductor.

Accordingly, an aspect of the disclosed and claimed concept is to provide an improved electrical surge protection device that is usable with an electrical enclosure and that is configured to restrain within the electrical surge protection device an increased ambient pressure that may result from a failure of a varistor of the electrical surge protection device.

Another aspect of the disclosed and claimed concept is to provide such an electrical surge protection device that includes an electrically conductive shield that is electrically connected with a ground or a neutral conductor and which is configured to shunt to the ground or neutral conductor the electrical energy from any arc that may be formed within the electrical surge protection device as a result of a voltage surge.

Another aspect of the disclosed and claimed concept is to provide such an electrical surge protection device wherein the shield additionally is configured to restrain within the electrical surge protection device the increased ambient pressure.

Accordingly, an aspect of the disclosed and claimed concept is to provide an improved electrical surge protection device that is structured to be installed on an electrical enclosure and that is structured to be electrically connected with a number of line conductors. The electrical surge protection device can be generally stated as including a support, a number of electrical components disposed on the support and structured to be electrically connected with the number of line conductors, an electrical conductor electrically connected with the number of electrical components, and a shield apparatus comprising an electrically conductive shield, the shield being situated on the support and being formed to have a hollow interior region within which at least a portion of the number of electrical components are generally situated, the shield and the support being structured to restrain within the interior region an increased ambient pressure generated by an electrical component of the number of electrical components from a power surge on a line conductor of the number of line conductors, the electrical conductor being electrically connected with the shield and being structured to be electrically connected with at least one of a ground conductor and a neutral conductor, the shield and the electrical conductor being structured to shunt to the at least one of a ground conductor and a neutral conductor any arc generated from a power surge on a line conductor of the number of line conductors.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
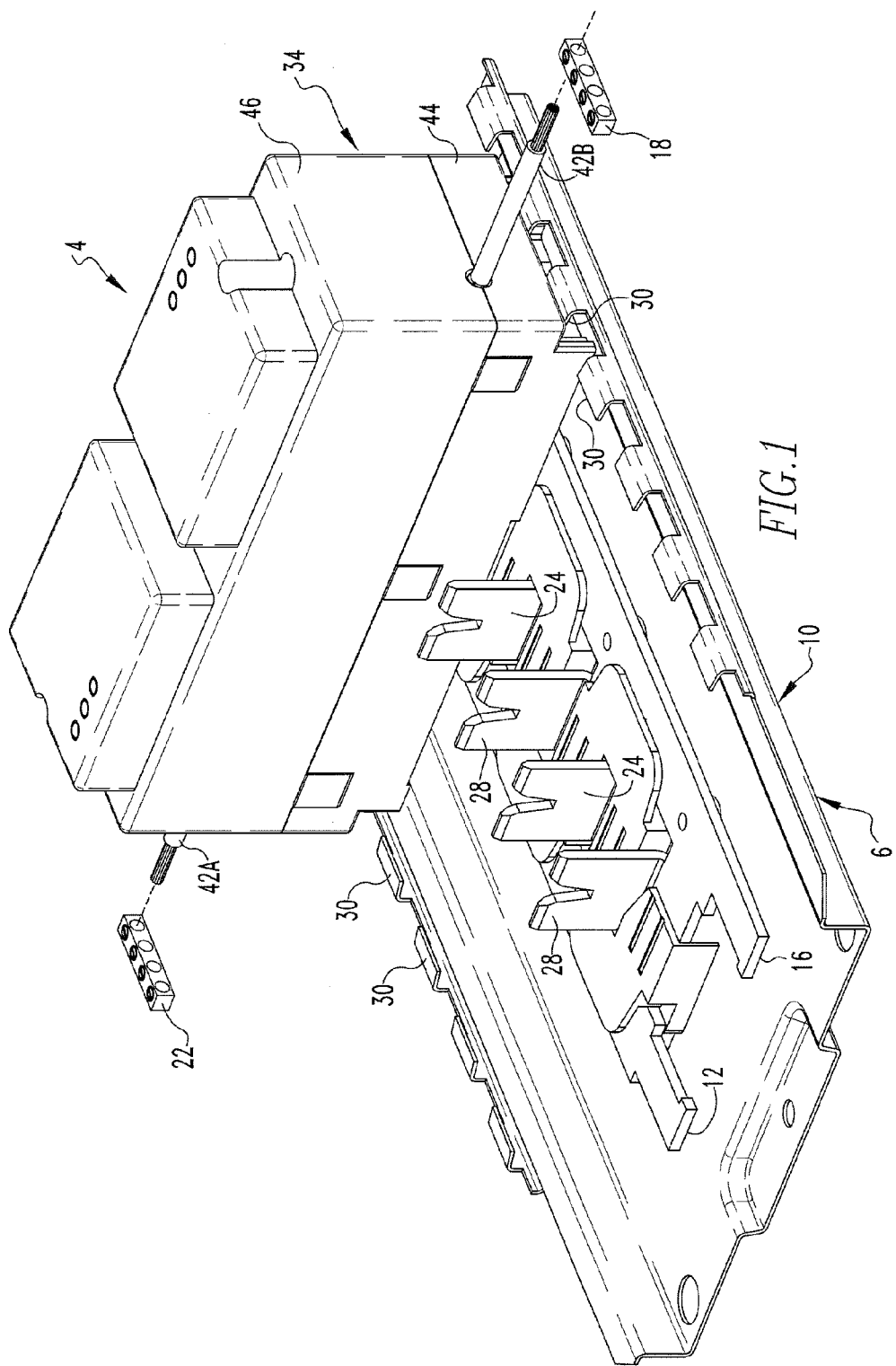
FIG. 1 is a perspective view of an improved electrical surge protection device in accordance with the disclosed and claimed concept installed on an electrical enclosure.
Figure 2:
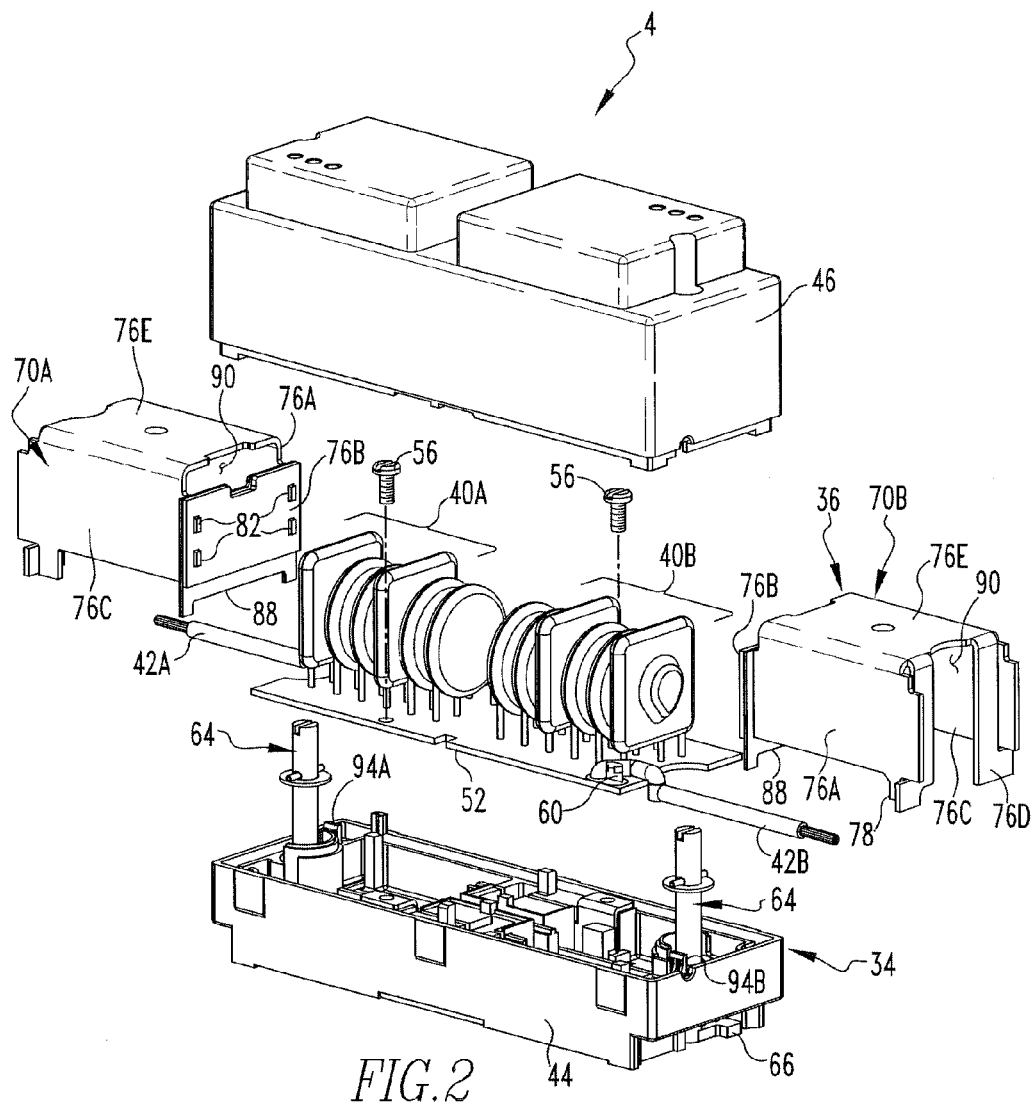
FIG. 2 is a perspective exploded view of the electrical surge protection device of FIG. 1.
Figure 3:
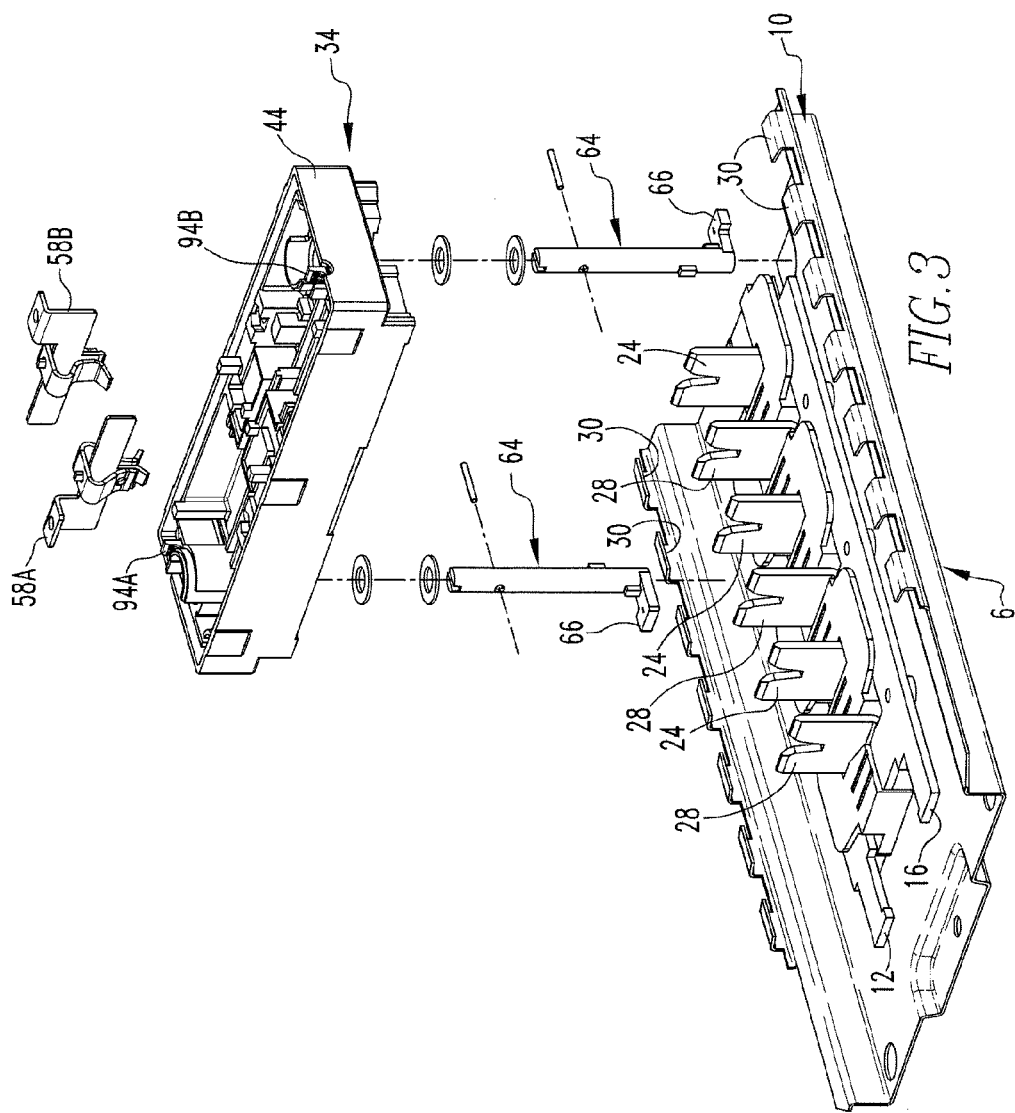
FIG. 3 depicts a portion of the electrical surge protection device of FIG. 1 in an exploded configuration that is additionally exploded away from the electrical enclosure of FIG. 2.
Figure 4:
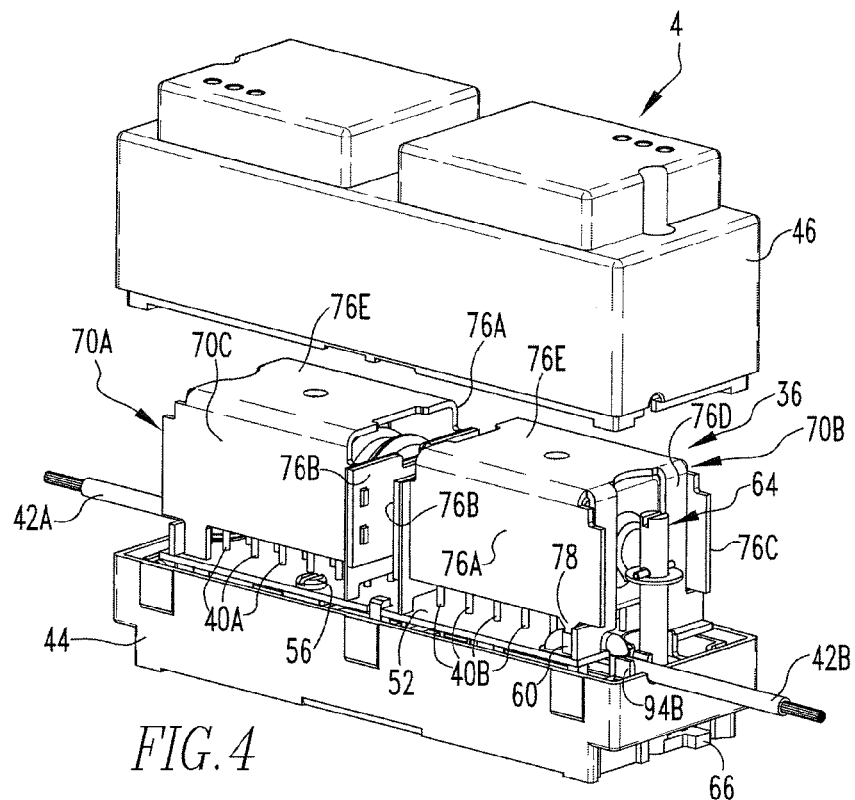
FIGS. 4 and 5 are additional exploded views of the electrical surge protection device of FIG. 1.
Figure 5:
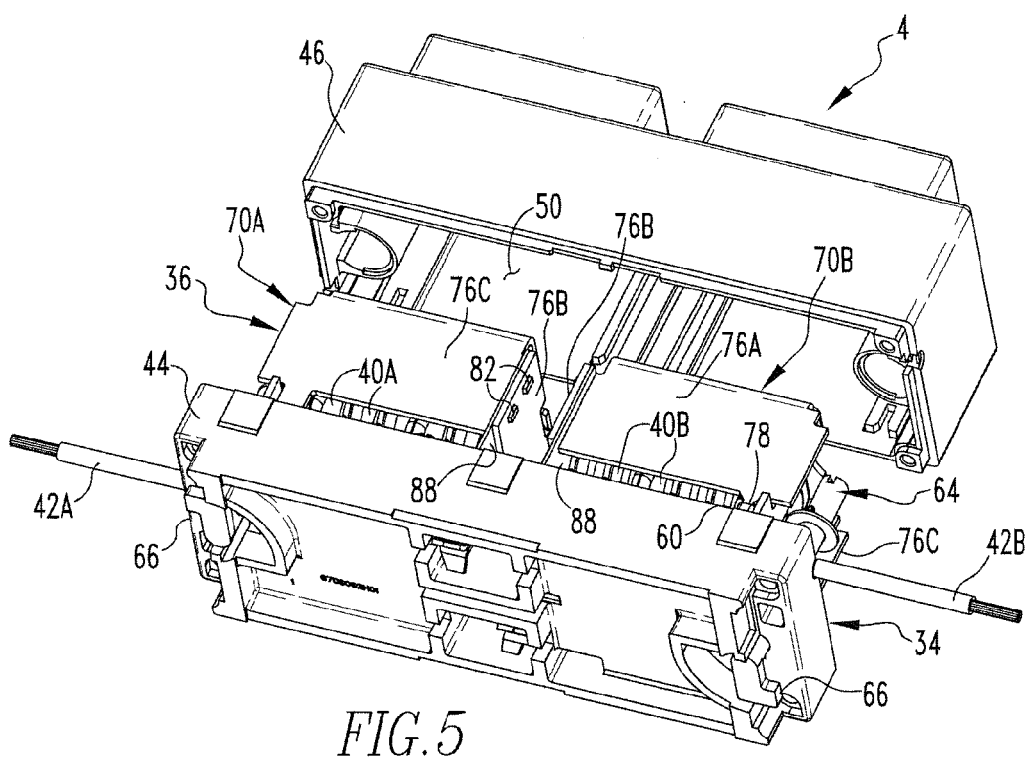
Figure 6:
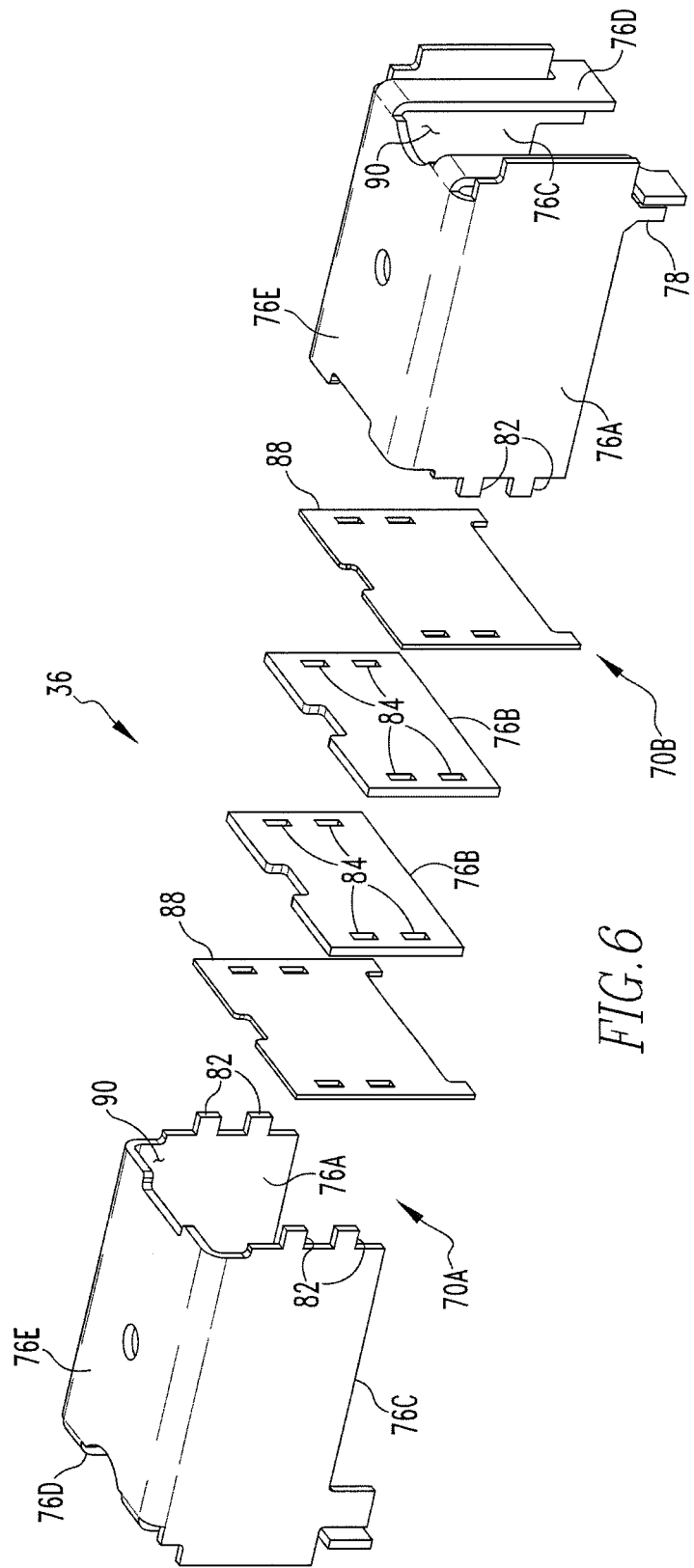
FIG. 6 is an exploded view of a shield apparatus of the electrical surge protection device of FIG. 1.

An improved electrical surge protection device 4 is depicted in FIGS. 1-2 and 4-5, and is depicted in part in FIGS. 3 and 6. The electrical surge protection device 4 is usable in conjunction with an electrical enclosure 6 that is depicted in a schematic fashion in FIGS. 1 and 3. The electrical enclosure 6 is depicted herein as being a load center but may be any of a wide variety of devices such as a circuit breaker panel and the like without limitation. The electrical surge protection device 4 is electrically connected with the electrical enclosure 6 and is mounted thereto within an interior thereof.

As can be understood from FIGS. 1 and 3, the electrical enclosure 6 is depicted herein as including a mount 10 upon which are situated a first bus 12 and a second bus 16 that serve as line conductors. The electrical enclosure 6 further has a neutral conductor 18 and a ground conductor 22 with which various circuits can be connected in a known fashion. The first bus 12 is formed to include a number of protuberant first stabs 24, and the second bus 16 is likewise formed to have a number of protuberant second stabs 28. As employed herein, the expression "a number of" and variations thereof shall refer broadly to any non-zero quantity, including a quantity of one. In a known fashion, the first and second stabs 24 and 28 are positioned alternately with one another along the length of the electrical enclosure 6. The electrical surge protection device 4 is connected with one of the first stabs 24 and with one of the second stabs 28 and thus, as will be set forth in greater detail below, advantageously protects the circuits on both the first and second buses 12 and 16 from damage due to voltage surges.

The mount 10 includes a plurality of fingers 30 which enable devices to be mounted to the electrical enclosure 6. By way of example, a circuit breaker or other such device may include a hook that is engaged with one of the fingers 30. Such a circuit breaker typically will also include a clip or other type of receiver that receives a portion of either a first stab 24 or a second stab 28 in electrical connection therewith. As will be set forth in greater detail below, the electrical surge protection device 4 is mounted to a pair of the fingers 30 that are situated at opposite sides of the electrical enclosure 6.

As can be understood from FIGS. 1-3, the electrical surge protection device 4 can be said to include a support 34 that is mountable to the electrical enclosure 6, a shield apparatus 36 that is mounted to the support 34, and a plurality of electrical components such as varistors that are arranged in a pair of varistor banks 40A and 40B. The varistor banks 40A and 40B in the depicted exemplary embodiment each include a number of varistors which may be MOVs or other types of varistors. The varistor banks 40A and 40B are operable to protect electrical devices that are connected with the first and second buses 12 and 16 from damage due to voltage surges. The electrical surge protection device 4 further includes a pair of electrical conductors 42A and 42B that are electrically connected with the varistor banks 40A and 40B, respectively, and which are also each connectable with the neutral conductor 18 or the ground conductor 22.

The support 34 can be said to include a base 44 that is mountable to the electrical enclosure 6 and a cover 46 that is mountable on the base 44. As is depicted generally in FIG. 5, an enclosed region 50 is formed generally between the base 44 and the cover 46. The shield apparatus 36 and the varistor banks 40A and 40B are disposed within the enclosed region 50.

The support 34 can further be said to include a circuit board 52 on which the varistor banks 40A and 40B are mounted. The circuit board 52 can be any of a variety of well understood boards such as printed circuit boards, although other types of boards and the like can be employed. The varistor banks 40A and 40B are electrically connected with and are disposed on the circuit board 52. The electrical conductors 42A and 42B are also electrically connected with the circuit board 52. The circuit board is attached via screws 56 or other structures to the base 44.

The support 34 further includes a pair of clips 58A and 58B (FIG. 3) which are electrically connected with the circuit board 52 on the surface thereof that faces generally toward the base 44. When the electrical surge protection device 4 is mounted on the electrical enclosure 6, the clips 58A and 58B are connected with a first stab 24 and a second stab 28 that are adjacent one another. That is, one of the clips 58A and 58B receives and is electrically connected with the first stab 24, and the other of the clips 58A and 58B receives and is electrically connected with the second stab 28. The support 34 further includes a pair of receptacles 60, only one of which is expressly depicted herein, that are mounted to the circuit board 52 at diagonally opposed locations thereon. The electrical conductor 42A is electrically connected with one of the receptacles 60, and the electrical conductor 42B is electrically connected with the other of the receptacles 60, and it can thus be understood from FIGS. 1-2 and 4-5 that the electrical conductors 42A and 42B are likewise connected with the circuit board 52 at diagonally opposite locations thereon. As can be understood from FIGS. 2-4, the base 44 further has a pair of wire stays 94A and 94B situated thereon that are structured to physically retain the electrical conductors 42A and 42B, respectively, as the electrical conductors 42A and 42B extend away from the circuit board 52. As can be understood from FIGS. 2 and 3, the wire stays 94A and 94B are likewise disposed at diagonally opposite locations on the base 44.

The support 34 further includes a pair of fasteners 64. Each fastener 64 includes an engagement element 66 that is mechanically engageable with one of the fingers 30 to releasably affix the base 44 and thus the electrical surge protection device 4 to the electrical enclosure 6.

The shield apparatus 36 can be said to include a pair of shields 70A and 70B which may be referred to collectively or individually herein generally with the numeral 70. The shields 70 are formed at least in part of an electrically conductive material such as metal or other appropriate material. As can be understood from FIG. 6, the shield 70A and the shield 70B are essentially identical to one another and are mounted in essentially opposite directions on the circuit board 52, as is shown generally in FIG. 2. The shields 70 each include a plurality of walls 76A, 76B, 76C, 76D, and 76E, which may be referred to collectively or individually herein with the numeral 76. The walls 76A, 76C, 76D, and 76E may be formed via stamping or any of a variety of appropriate formation methodologies.

The shields 70 each include a tab 78 (only one of which is depicted in FIGS. 2 and 4-6) that protrudes from the wall 76A at the side that is opposite the connection with the wall 76E. The tabs 78 are slidably receivable in the receptacles 60 and are frictionally retained therein in order to electrically connect the shields 70A and 70B with the electrical conductors 42A and 42B, respectively.

As can be understood from FIG. 6, the wall 76B is formed as a component that is separate from the other walls 76 of the shields 70. The walls 76A and 76C each have a number of protuberant lugs 82 formed thereon that are receivable in holes 84 formed in the wall 76B. The lugs 82 are then deformed to affix the wall 76B to the walls 76A and 76C. The shields 70 each further include an insulative layer 88 that is situated adjacent the wall 76B and that is formed of an insulative material such as fiberglass or the like without limitation.

The walls 76 of the shields 70 are arranged such that a generally hollow interior region 90 is formed that is adjacent the walls 76A, 76C, 76D, and 76E. The interior region 90 is also situated adjacent the insulative layer 88, whereby the insulative layer 88 can be generally stated to be interposed between the interior region 90 and the wall 76B.

The varistor bank 40A has one of its poles connected with the clip 58A in the depicted exemplary embodiment. The other pole of the varistor bank 40A is electrically connected with the electrical conductor 42A and with the receptacle 60 that is electrically connected with and is affixed to the circuit board 52. Likewise, one pole of the varistor bank 40B is connected with the clip 58B, and the other pole thereof is connected with the electrical conductor 42B and the likewise electrically connected corresponding receptacle 60.

The clip 58A is connected with one of the first bus 12 and the second bus 16, and the clip 58B is connected with the other of the first bus and the second bus 12 and 16. When the voltage in the first and second buses 12 and 16 is within a predetermined range, the resistance of the varistor banks 40A and 40B is very high and thus very little current is conducted by the varistor banks 40A and 40B to the electrical conductor 42A and 42B, respectively. However, in the event of a voltage surge wherein the voltage on either or both of the first and second buses 12 and 16 is outside the predetermined voltage range, the resistance of the resistor banks 40A and/or 40B is reduced, thereby causing electrical energy from the first and/or second buses 12 and 16 to be shunted to the neutral conductor 18 or the ground conductor 22.

Advantageously, in the event that the varistor banks 40A and/or 40B should experience a catastrophic failure, such as might result in an increased ambient pressure within the interior region 90, the shield 70 will restrain the increased ambient pressure within the interior region 90 until it can flow naturally through the openings that are formed in the shields 70 and that exist between the shield 70 and the circuit board 52. This advantageously avoids having the cover 46 being blown away from the base 44 due to an increased ambient pressure within the enclosed region 50. Moreover, since the shields 70 are formed of an electrically conductive material, any electrical arc that may result from such a catastrophic failure of the varistor banks 40A and/or 40B will be conducted via the shields 70A and/or 70B to the connected receptacles 60 and thus to the corresponding electrical conductors 42A and/or 42B. In such a fashion, the arc electrical energy is shunted to the neutral and/or ground conductors 18 and 22.

The metallic and thus electrically conductive nature of the shields 70 thus both physically restrains within the interior region 90 an increased ambient pressure and shunts away any arc electrical energy that may result from a catastrophic failure of the varistor banks 40A and/or 40B. This maintains the physical integrity of the electrical surge protection device 4 in the event of a voltage surge, which correspondingly avoids destruction of the electrical enclosure 6 and/or the other components connected therewith in the event of a voltage surge.

As can be understood from FIGS. 4 and 5, the shields 70 are arranged such that the walls 76B are spaced apart from one another. As such, the walls 76B of the two shields 70A and 70B are capable of having electrical conductors, components, and the like situated between them. By providing the insulative layer 88 between the interior region 90 and the wall 76B, any arc event that may occur within the interior region 90 as a result of a voltage surge will be insulated from any electronic components that may be situated between the walls 76B. That is, while the walls 76B are situated adjacent one another, albeit spaced apart, the insulative layers 88 insulate any components that may be situated between the shields 70A and 70B from damage due to an electrical arc, such as might occur within the interior region 90 as a result of a catastrophic failure of the varistor banks 40A and/or 40B.

It thus can be seen that the improved shield apparatus 36 physically restrains within the interior region 90 an increased ambient pressure that may result from a catastrophic failure of the varistor banks 40A and/or 40B, whereby the explosive force from such increased ambient pressure is resisted from blowing the cover 46 off the base 44. While the shields 70 are situated within the enclosed regions 50, the shields 70 nevertheless protect the cover 46 and thus the electrical enclosure 6 and the other components connected therewith from destruction due to the increased ambient pressure that might occur as a result of a voltage surge. The physical attachment of the tabs 78 to the receptacles 60 effectively affixes the shields 70 to the circuit board 52.

Moreover, since the shields 70 are electrically conductive, any electrical arc that may be formed within the interior region 90, such as may occur due to a catastrophic failure of the varistor banks 40A and/or 40B during a voltage surge, will be shunted to the neutral or ground conductors 18 or 22 and will likewise be resisted from damaging the electrical surge protection device 4 or the electrical enclosure 6. While it is understood that a catastrophic failure of the varistor banks 40A and/or 40B will require the replacement of the electrical surge protection device 4, the electrical surge protection device 4 is advantageously configured to avoid damaging the electrical enclosure 6 or the other electrical equipment that may be connected therewith, which is advantageous.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical surge protection device structured to be installed on an electrical enclosure and to be electrically connected with a number of line conductors, the electrical surge protection device comprising:

a support;

a number of electrical components disposed on the support and structured to be electrically connected with the number of line conductors;

an electrical conductor electrically connected with the number of electrical components;

a shield apparatus comprising an electrically conductive shield, the shield being situated on the support and being formed to have a hollow interior region within which at least a portion of the number of electrical components are generally situated, the shield and the support being structured to restrain within the interior region an increased ambient pressure generated by an electrical component of the number of electrical components from a power surge on a line conductor of the number of line conductors; and the electrical conductor being electrically connected with the shield and being structured to be electrically connected with at least one of a ground conductor and a neutral conductor, the shield and the electrical conductor being structured to shunt to the at least one of a ground conductor and a neutral conductor any arc generated from a power surge on a line conductor of the number of line conductors.

2. The electrical surge protection device of claim 1 wherein the support comprises a base that is structured to be mounted to the electrical enclosure and a circuit board to which the number of electrical components are electrically connected.

3. The electrical surge protection device of claim 2 wherein the shield is mounted to at least one of the circuit board and the base.

4. The electrical surge protection device of claim 2 wherein the shield and the electrical conductor are electrically connected with the circuit board.

5. The electrical surge protection device of claim 4 wherein the shield apparatus further comprises another shield that is electrically conductive and another electrical conductor, the another shield being formed to have another hollow interior region within which at least another portion of the number of electrical components are generally situated, the electrical conductor being electrically connected with the circuit board at a location thereon, the another electrical conductor being electrically connected with the circuit board at another location thereon, the location and the another location being diagonally opposite one another.

6. The electrical surge protection device of claim 2 wherein the shield comprises a number of walls and further comprises a tab that protrudes from a wall of the number of walls, and wherein the circuit board comprises a receptacle that is electrically connected with the electrical conductor, the tab being received in the receptacle and thereby electrically connecting together the shield and the electrical conductor.

7. The electrical surge protection device of claim 6 wherein the tab has a sliding friction fit with the receptacle.

8. The electrical surge protection device of claim 6 wherein the shield further comprises an insulative layer situated generally between the interior region and a wall of the number of walls.

9. The electrical surge protection device of claim 6 wherein the shield further comprises an insulative layer situated adjacent a wall of the number of walls, and wherein the shield apparatus further comprises another shield that is electrically conductive and another electrical conductor, the another shield being formed to have another hollow interior region within which at least another portion of the number of electrical components are generally situated, the another shield comprising another number of walls and another insulative layer situated adjacent another wall of the another number of walls, the wall and the another wall being situated adjacent one another.

10. The electrical surge protection device of claim 9 wherein the insulative layer is situated generally between the interior region and the wall, wherein the another insulative layer is situated generally between the another interior region and the another wall, and wherein the wall and the another wall are spaced apart.

11. The electrical surge protection device of claim 1 wherein the support comprises a base that is structured to be mounted to the electrical enclosure and a cover that is situated on the base, the base and the cover together being formed to have a hollow enclosed region situated generally between the base and the cover, the shield being situated within the enclosed region.

12. The electrical surge protection device of claim 11 wherein shield is retained within the enclosed region by the cover.

* * * * *